United States Patent
Lee et al.

(10) Patent No.: US 10,191,601 B2
(45) Date of Patent: Jan. 29, 2019

(54) ELECTRONIC DEVICE WITH TOUCH CONTROL CIRCUIT POWERED BY DEDICATED POWER SOURCE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 453 days.

(21) Appl. No.: 14/959,638

(22) Filed: Dec. 4, 2015

(65) Prior Publication Data

US 2016/0162075 A1 Jun. 9, 2016

(30) Foreign Application Priority Data

Dec. 5, 2014 (TW) .............................. 103142379 A

(51) Int. Cl.
| | |
|---|---|
| G06F 3/044 | (2006.01) |
| G06F 1/26 | (2006.01) |
| G06F 3/041 | (2006.01) |
| G06F 1/18 | (2006.01) |

(52) U.S. Cl.
CPC .............. G06F 3/044 (2013.01); G06F 1/189 (2013.01); G06F 1/26 (2013.01); G06F 3/0418 (2013.01)

(58) Field of Classification Search
CPC ........ G06F 3/044; G06F 3/0418; G06F 1/189; G06F 1/26
See application file for complete search history.

(56) References Cited

U.S. PATENT DOCUMENTS

| | | | | |
|---|---|---|---|---|
| 2013/0052963 | A1* | 2/2013 | Briden | H04B 5/0031 455/73 |
| 2014/0210767 | A1* | 7/2014 | Hur | G06F 3/0412 345/174 |
| 2014/0232691 | A1* | 8/2014 | Lee | G06F 3/044 345/174 |
| 2014/0246906 | A1* | 9/2014 | Wang | H02J 9/061 307/23 |

FOREIGN PATENT DOCUMENTS

TW 201350974 12/2013

* cited by examiner

*Primary Examiner* — Aneeta Yodichkas
(74) *Attorney, Agent, or Firm* — Muncy, Geissler, Olds & Lowe, P.C.

(57) ABSTRACT

An electronic device with touch control circuit powered by dedicated power source includes a functional circuit, a plurality of touch sensing electrodes, and a touch sensing control circuit. The functional circuit is powered by a first power source. The touch sensing electrodes are provided for sensing a touch from an external object. The touch sensing control circuit is powered by a second power source which is different from the first power source. The touch sensing control circuit is connected to the touch sensing electrodes for driving the touch sensing electrodes to sense the touch, wherein there is no common current loop between the first power source and the second power source during an operation of touch sensing.

13 Claims, 14 Drawing Sheets

ELECTRONIC DEVICE WITH TOUCH CONTROL CIRCUIT POWERED BY DEDICATED POWER SOURCE

BACKGROUND OF THE INVENTION

1. Field of the Invention

The present invention relates to the technical field of touch panels and, more particularly, to an electronic device with touch control circuit powered by dedicated power source.

2. Description of Related Art

The conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate, and increase reflectance and haze of the touch display panel.

On-cell and in-cell touch technology were invented to overcome the drawbacks of traditional touch technology described above. The on-cell technology is to dispose a sensor on the back side of a color filter substrate to form a completed color filter substrate. One of the on-cell touch technologies is provided to dispose a touch sensor on a thin film and then bond the thin film onto the upper one of the two substrates. The in-cell technology is to dispose the sensor within the LCD cell structure. However, when the sensor is disposed within the LCD cell structure, the distance between the sensor and the common voltage layer is only several micrometers and thus the capacitance induced therebetween is greatly increased, such that, in comparison with such a large capacitance, the capacitance change caused by touch is too small to be detected. Furthermore, because of the short distance, the display signal may be seriously interfered, resulting in a bad display quality.

FIG. 1A schematically illustrates the transparent electrode structure of a single-layer touch panel. As shown, there is a plurality of transparent electrodes 11 arranged in rows and columns, and the electrical signal sensed by one transparent electrode 11 is transmitted through a corresponding conductive wire 12 for output. Such a single-layer transparent electrode structure can realize an actual multi-touch detection. In use, the single-layer transparent electrode structure of FIG. 1A is combined with a display panel. However, when the single-layer transparent electrode structure is integrated to the inside of a display panel, there will be an obvious capacitance produced between the single-layer transparent electrode structure and a common voltage (Vcom) layer of the display panel, which may cause noises to be produced and thus lower the accuracy in detection the touch position. Therefore, it is known that the touch control circuit, particularly the touch control circuit of the in-cell touch panel, is highly susceptible to noises, and accordingly its design has to avoid the noise interference as much as possible.

FIG. 1B is a schematic diagram illustrating how a touch control circuit is interfered by noise. As shown, in an electronic device such as a smart phone, a touch control circuit chip 13 is connected to a sensor electrode 15 through a conductive wire 14 for sensing analog signal generated by a finger's touch. In addition, a microprocessor 16 in the electronic device is connected to another circuit chip 18 or the touch control circuit chip 13 through a connection wire 17 in order to transmit digital signal for providing a corresponding function of the electronic device. For an in-cell touch structure, the microprocessor can be replaced with an LCD display driving circuit and a common voltage layer. Since the electronic devices tend to be compact, the conductive wire 14 and the connection wire 17 are typically very close to each other. Moreover, the touch control circuit chip 13, the microprocessor 16, and the another circuit chip 18 in the electronic device are powered by a single battery power source. As a result, the analog signal of the conductive wire 14 is likely to be interfered by the control signal of the connection wire 17, resulting in an error on touch sensing.

Therefore, it is desirable to provide an improved touch control circuit to an electronic device to mitigate and/or obviate the aforementioned problems.

SUMMARY OF THE INVENTION

The object of the present invention is to provide an electronic device with touch control circuit powered by dedicated power source, which can increase the accuracy of touch sensing operated by the touch control circuit.

To achieve the object, there is provided an electronic device with touch control circuit powered by dedicated power source, which includes: a functional circuit powered by a first power source; a plurality of touch sensing electrodes for sensing a touch from an external object; and a touch sensing control circuit powered by a second power source which is different from the first power source, and connected to the plurality of touch sensing electrodes for driving the plurality of touch sensing electrodes to sense the touch of the external object, wherein there is no common current loop between the first power source and the second power source or there is a current loop formed through a high impedance element during an operation of touch sensing.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
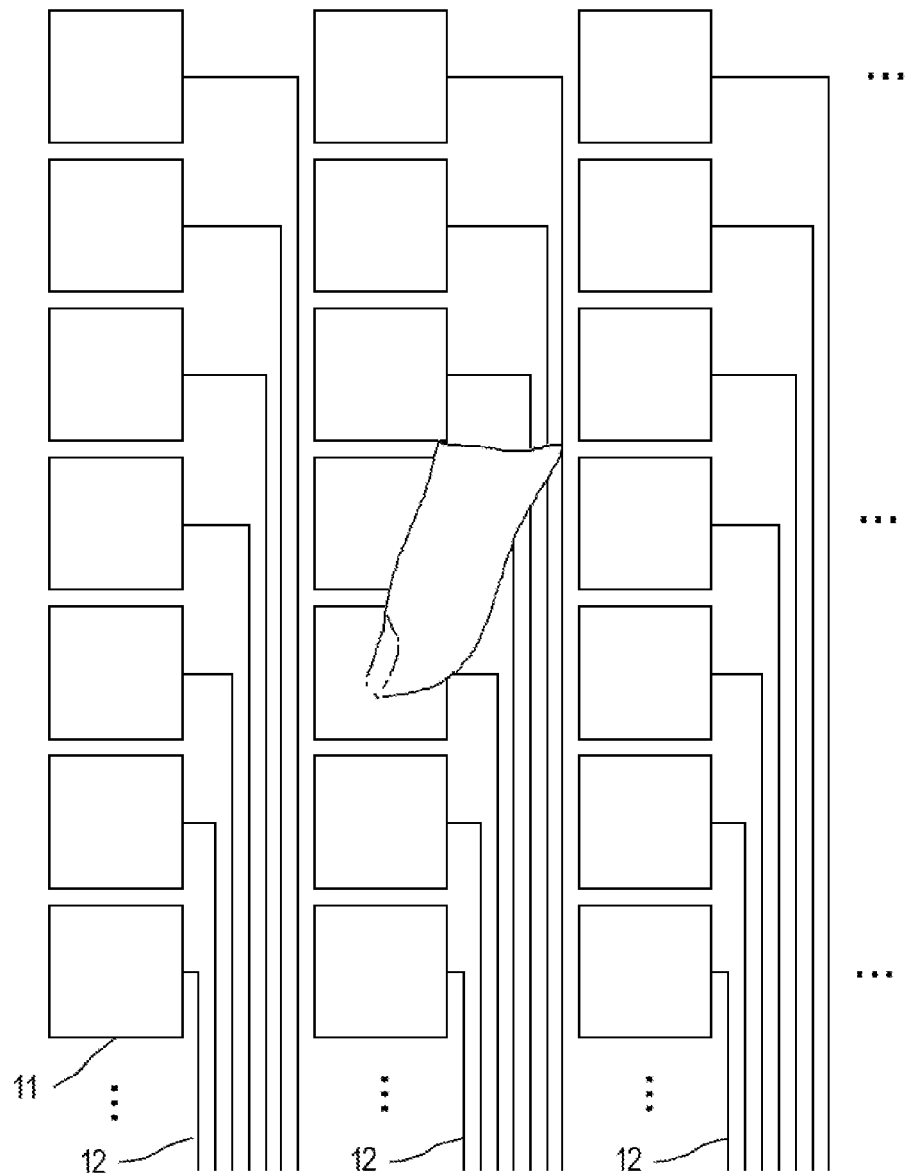
FIG. 1A schematically illustrates the transparent electrode structure of a single-layer touch panel in the prior art.
Figure 1B:
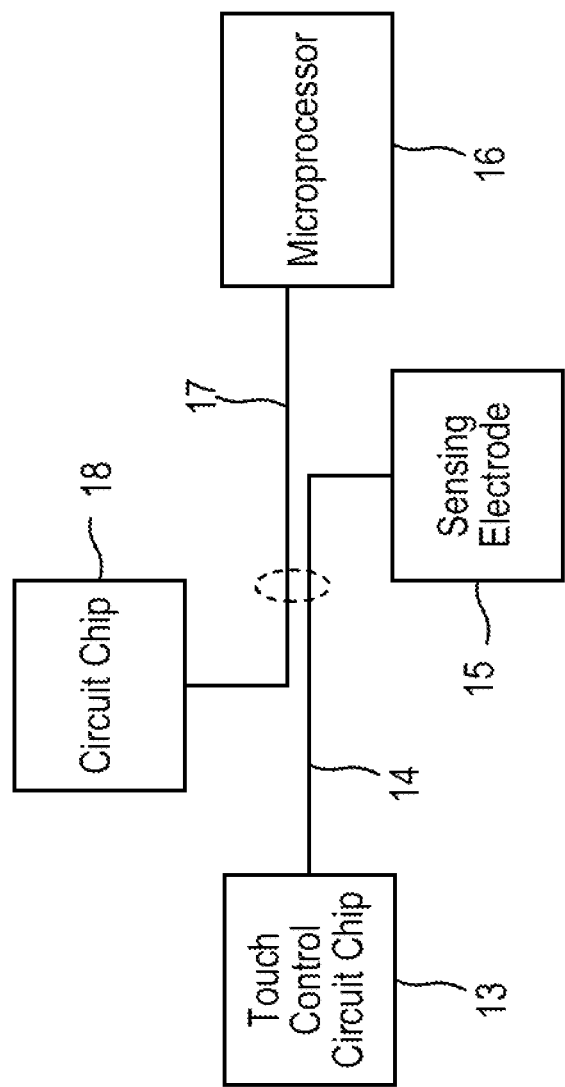
FIG. 1B is a schematic diagram illustrating how a touch control circuit is interfered with by noise in the prior art.
Figure 2:
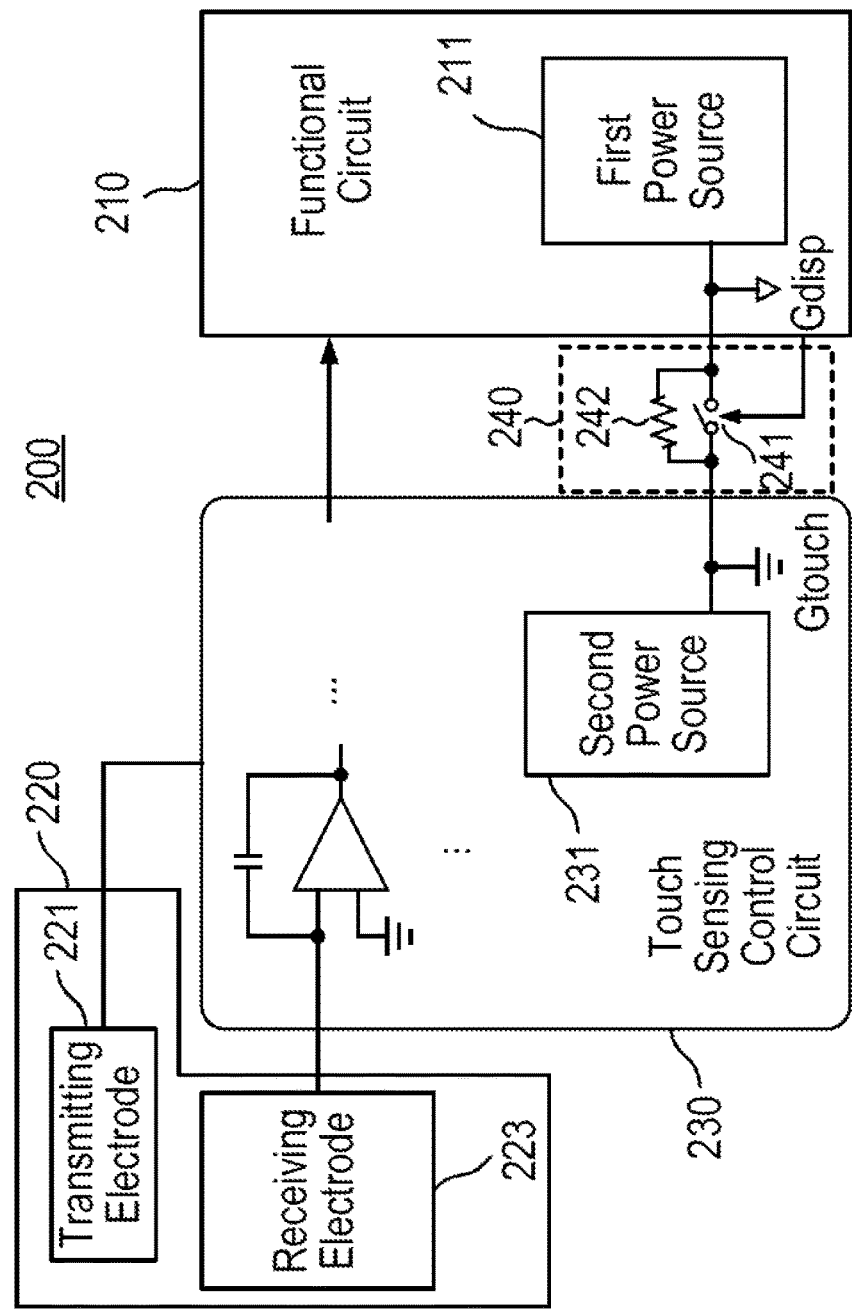
FIG. 2 is a schematic diagram of an electronic device with touch control circuit powered by dedicated power source according to a first embodiment of the present invention.

FIG. 2 is a schematic diagram of an electronic device 200 with touch control circuit powered by dedicated power source according to a first embodiment of the present invention. As shown in FIG. 2, the electronic device 200 includes a functional circuit 210, a plurality of touch sensing electrodes 220, a touch sensing control circuit 230, and a switch device 240. The switch device 240 is a switch element 241 capable of switching its two terminals to be connected or disconnected. Alternatively, the switch device 240 may include the switch element 241 and a high impedance element 242 connected to the two terminals of the switch element 241. In this embodiment, the switch device 240 includes the switch element 241 and the high-impedance element 242 connected to the two terminals of the switching element 241.

The functional circuit 210 is a circuit to provide specific functions of the electronic device 200 and is powered by a first power source 211. The functional circuit 210 and the first power source 211 have a first grounding terminal referring to a first ground (Gdisp). The functional circuit 210 can be a display control circuit connected to a display unit (not shown) for controlling the display unit to display image.

The touch sensing electrodes 220 are provided for sensing the touch of an external object. As shown in FIG. 2, the touch sensing electrodes 220 can be divided into transmitting electrodes (TX) 221 and receiving electrodes (RX) 223. In FIG. 2, only one transmitting electrode (TX) 221 and one receiving electrode (RX) 223 are shown. However, in practical application, there are a plurality of transmitting electrodes (TX) 221 and a plurality of receiving electrodes (RX) 223 arranged on a touch panel (not shown) in horizontal and vertical directions. Namely, the touch sensing in this embodiment uses the mutual-capacitance touch sensing mode.

The touch sensing control circuit 230 is powered by a second power source 231 which is different from the first power source 211. The touch sensing control circuit 230 and the second power source 231 have a second grounding terminal referring to a second ground (Gtouch). The touch sensing control circuit 230 is connected to the plurality of touch sensing electrodes 220 for driving the touch sensing electrodes 220 to sense a touch of the external object. During an operation of the touch sensing, there is no common current loop between the first power source 211 and the second power source 231 or there is a current loop formed through a high impedance element.

The switch device 240 is connected between the grounding terminal of the first power source 211 and the grounding terminal of the second power source 231 for controlling the grounding terminal of the first power source 211 and the grounding terminal of the second power source 231 to be connected or disconnected. Namely, during the operation of the touch sensing, the first power source 211 and the second power source 231 are disconnected, and thus there is no common current loop. During the operation exclusive of touch sensing, the first power source 211 and the second power source 231 are connected, so as to have a common current loop.

The switch device 240 includes at least one switch element 241, which is preferably a transistor switch element. The switch device 240 may further include a high impedance element 242. The high impedance element 242 is connected to the switch element 241 in parallel for preventing an electrostatic voltage difference from being generated between the functional circuit 210 and the touch sensing control circuit 230. The high impedance element 242 is a resistor with a resistance greater than 1 MΩ. The functional circuit 210 controls the switch element 241 to be on or off. In other embodiments, the touch sensing control circuit 230 is employed to control the switch element 241 to be on or off. Optionally, the touch sensing control circuit 230, the second power source 231 and the switch device 240 are implemented in an integrated circuit chip.

Figure 3A:
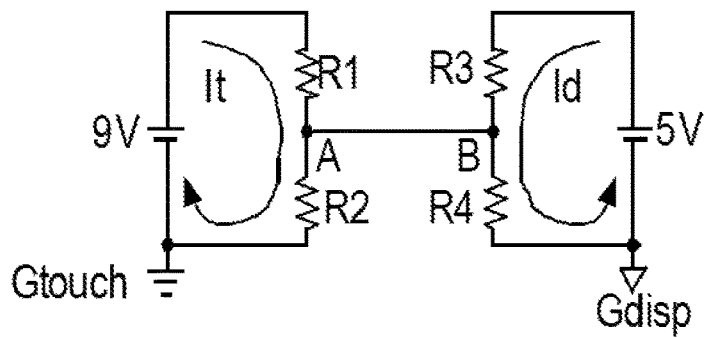
FIG. 3A is a schematic diagram illustrating the operation principle of the electronic device with touch control circuit powered by dedicated power source according to the present invention.

FIG. 3A is a schematic diagram illustrating the operation principle of the electronic device 200 with touch control circuit powered by dedicated power source according to the present invention. In FIG. 3A, the point A of the current loop circuit at the left side and the point B of the current loop circuit at the right side are connected together. Namely, there is only one common point (A/B) between the two circuits that have no common ground and no common power source, and in this case the point A can be regarded as same as the point B. As shown in FIG. 3A, the point A has a voltage of (9V*R2)/(R1+R2) relative to the second ground (Gtouch), and the point A has a voltage of (5V*R4)/(R3+R4) relative to the first ground (Gdisp). Accordingly, the 5V power source for the circuit at the right side does not influence the circuit at the left side, and the 9V power source for the circuit at the left side also does not influence the circuit at the right side.

Figure 3B:
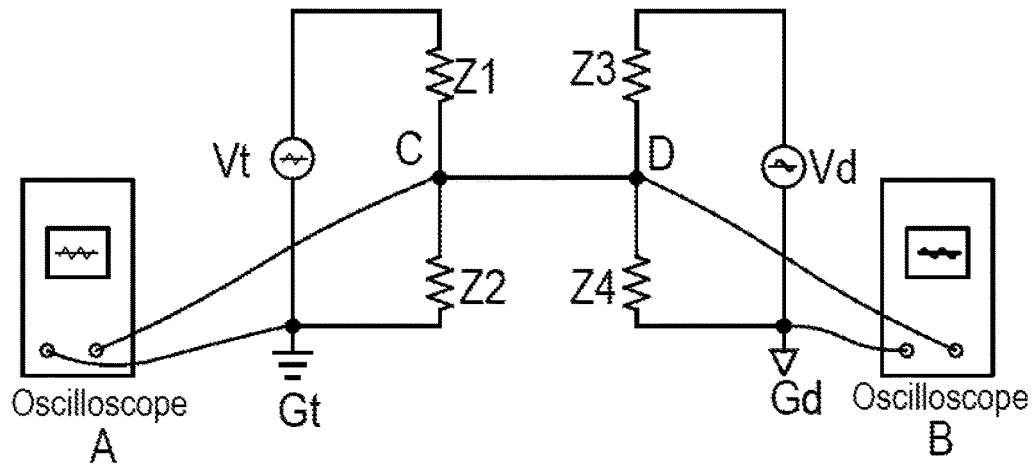
FIG. 3B is another schematic diagram illustrating the operation principle of the electronic device with touch control circuit powered by dedicated power source according to the present invention.

FIG. 3B is another schematic diagram illustrating the operation principle of the electronic device 200 with touch control circuit powered by dedicated power source according to the present invention. As shown in FIG. 3B, there is only one connection point (point C is the same as point D) between the left-side circuit and the right-side circuit that have no common ground. The left-side circuit has an AC signal source Vt, which provides a triangle wave signal. The right-side circuit has another AC signal source Vd, which provides a sine wave signal. Since there is no common current loop between the left-side circuit and the right-side circuit, the oscilloscope (A) measures a triangle wave signal with an amplitude of (Vt*Z2)/(Z1+Z2) relative to the second grounding terminal Gt at the point C, which does not have any component of the sine wave signal source at the right side. Similarly, the oscilloscope (B) measures a sine wave signal with an amplitude of (Vd*Z4)/(Z3+Z4) relative to the first grounding terminal Gd at the point D, which does not have any component of the triangle wave signal source at the left side. Accordingly, the AC signals at the left side and the right side are not influenced to each other.

Figure 3C:
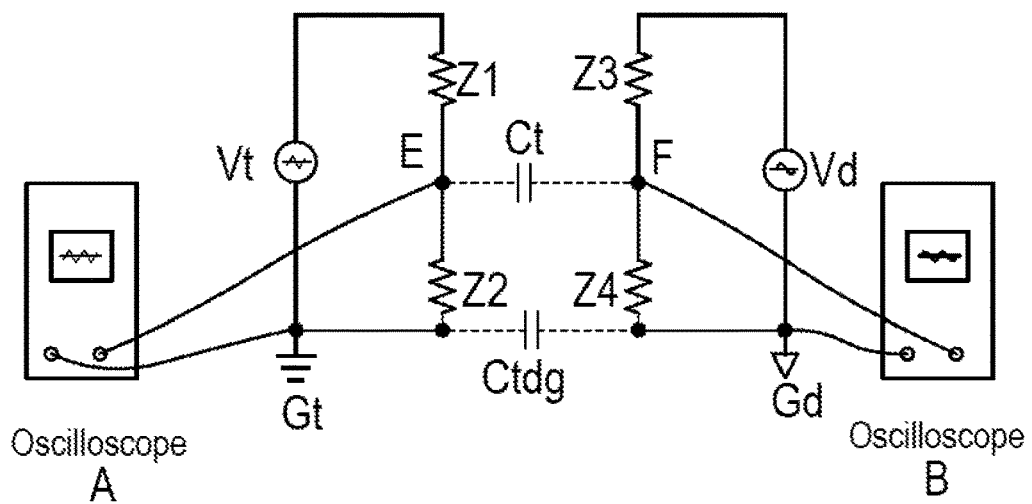
FIG. 3C is a further schematic diagram illustrating the operation principle of the electronic device with touch control circuit powered by dedicated power source according to the present invention.

FIG. 3C is a further schematic diagram illustrating the operation principle of the electronic device 200 with touch control circuit powered by dedicated power source according to the present invention. As shown in FIG. 3C, the left-side circuit and the right-side circuit have no common ground, no common current loop, and no connection, wherein Ct indicates a parasitic capacitance between point E of the left-side circuit and point F of the right-side circuit, and Ctdg indicates a parasitic capacitance between the ground (second grounding terminal) of the left-side circuit and the ground (first grounding terminal) of the right-side circuit. The left-side circuit includes an AC signal source Vt, which is a triangle wave signal, and the right-side circuit includes an AC signal source Vd, which is a sine wave signal. When the Ctdg is very small, its impedance is almost infinite, so that the oscilloscope (A) measures a triangle wave signal with an amplitude of (Vt*Z2)/(Z1+Z2) relative to the second ground Gt at the point E, which does not have any component of the sine wave signal source at the right side. Similarly, the oscilloscope (B) measures a sine wave signal with an amplitude of (Vd*Z4)/(Z3+Z4) relative to the first grounding terminal Gd at the point F, which does not have any component of the triangle wave signal source at the left side. Accordingly, the AC signals at the left side and the right side are not influenced to each other.

In FIGS. 3B and 3C, the left-side and the right-side AC signal sources Vt and Vd respectively represent individual activation signals of two circuits without common current loop, and noises superimposed on the power sources of the two circuits, which can be a combination of various frequencies and waveforms. The triangle wave and sine wave in the figures are for illustrative purpose only, but not for a limit.

As shown in FIGS. 3A, 3B, and 3C, it is known that, when performing an operation of touch sensing, the signal or noise on the functional circuit 210 dose not influence the touch sensing control circuit 230 since there is no common current loop between the first power source 211 and the second power source 231. Therefore, the touch sensing sensitivity and accuracy of the touch sensing control circuit 230 can be increased when performing the touch sensing.

Figure 4:
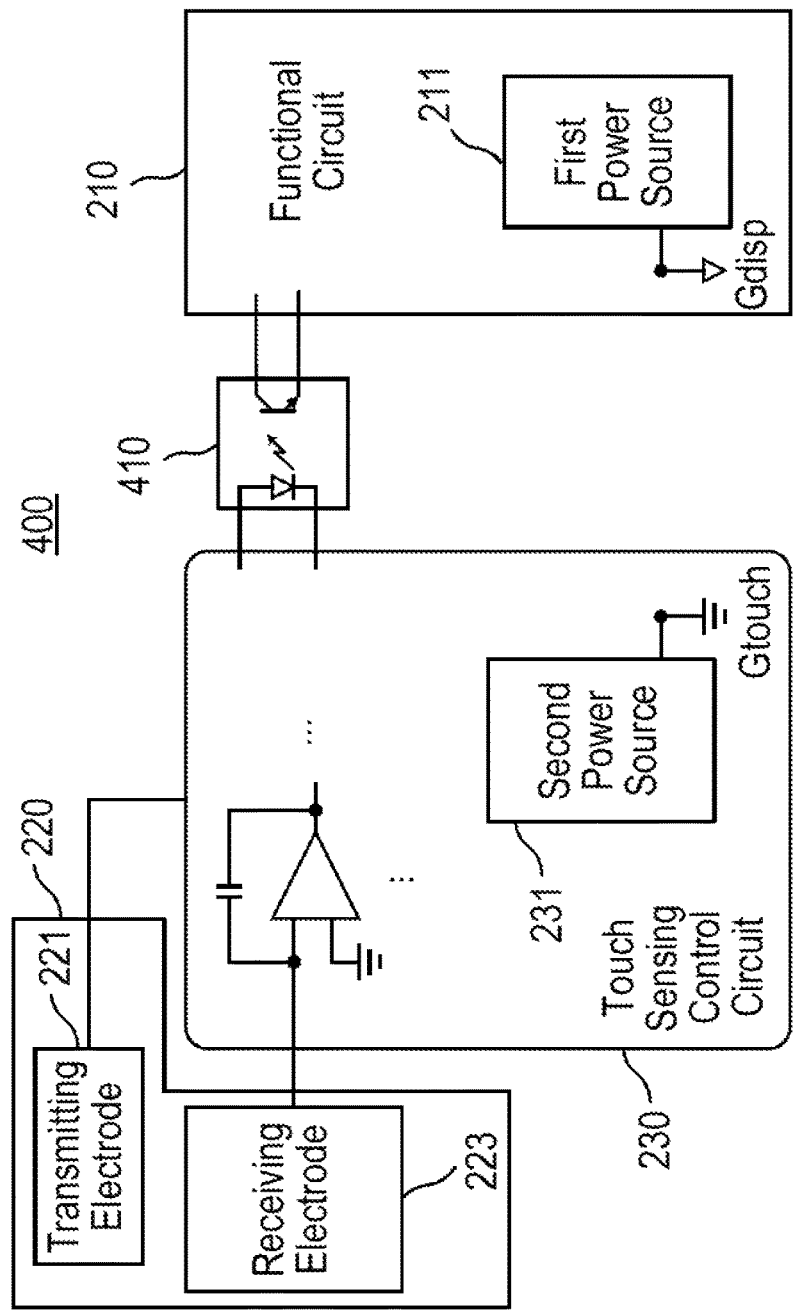
FIG. 4 is a schematic diagram of an electronic device with touch control circuit powered by dedicated power source according to a second embodiment of the present invention.

FIG. 4 is a schematic diagram of an electronic device 400 with touch control circuit powered by dedicated power source according to a second embodiment of the present invention. This embodiment is similar to that of FIG. 2 except that the at least one switch element 241 and the high impedance element 242 are removed and at least one optical coupling circuit 410 is added. The at least one optical coupling circuit 410 is disposed between the functional circuit 210 and the touch sensing control circuit 230 for performing signal transmission therebetween. Optionally, the touch sensing control circuit 230, the second power source 231 and the at least one optical coupling circuit 410 are implemented in an integrated circuit chip.

Figure 5:
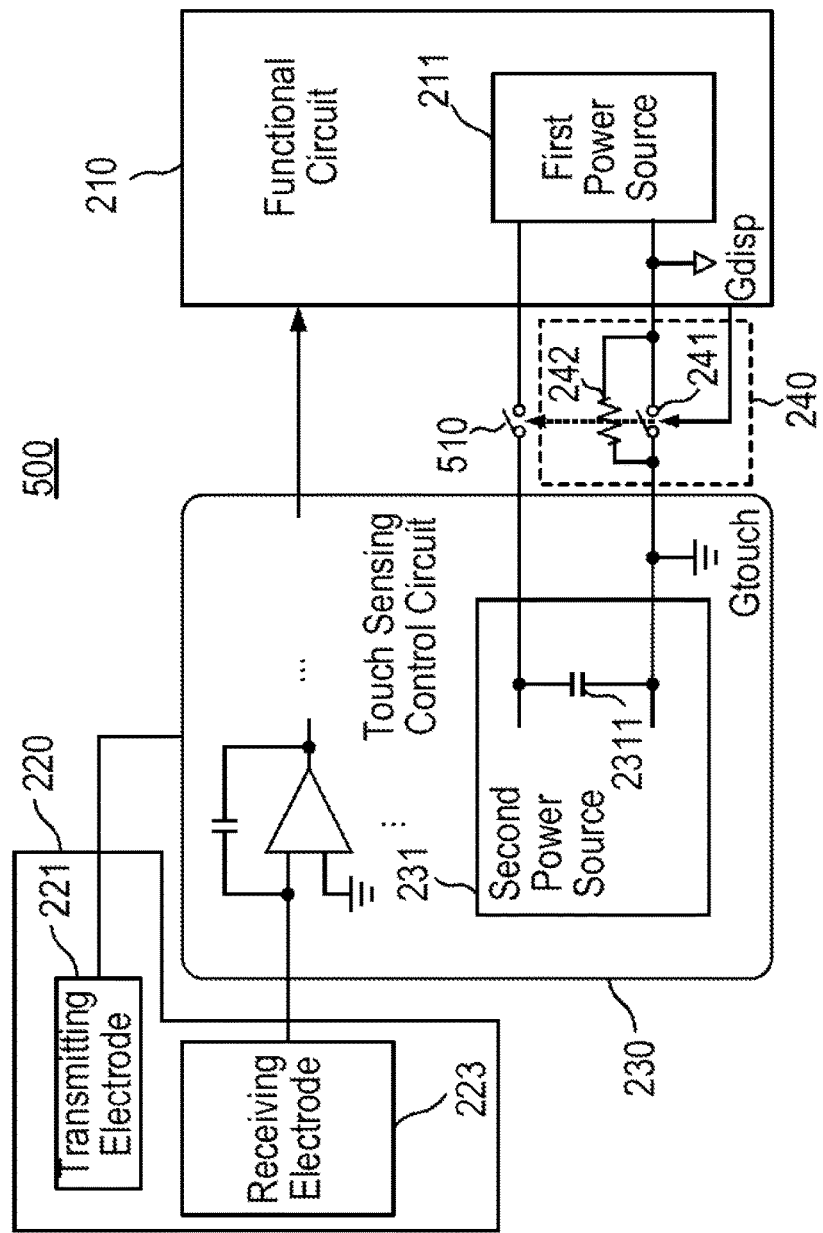
FIG. 5 is a schematic diagram of an electronic device with touch control circuit powered by dedicated power source according to a third embodiment of the present invention.

FIG. 5 is a schematic diagram of an electronic device 500 with touch control circuit powered by dedicated power source according to a third embodiment of the present invention. This embodiment is similar to that of FIG. 2 except that a power charging loop switch element 510 is added between the first power source 211 and the second power source 231. As a result, during the operation exclusive of touch sensing, the power charging loop switch element 510 is switched on to allow the first power source 211 to charge a chargeable capacitor 2311 of the second power source 231. In this embodiment, the switch elements are switched on and off under the control of the functional circuit 210. In other embodiments, the switch elements can be switched on and off under the control of the touch sensing control circuit 230. Optionally, the touch sensing control circuit 230, the second power source 231 and the power charging loop switch element 510 are implemented in an integrated circuit chip.

Figure 6:
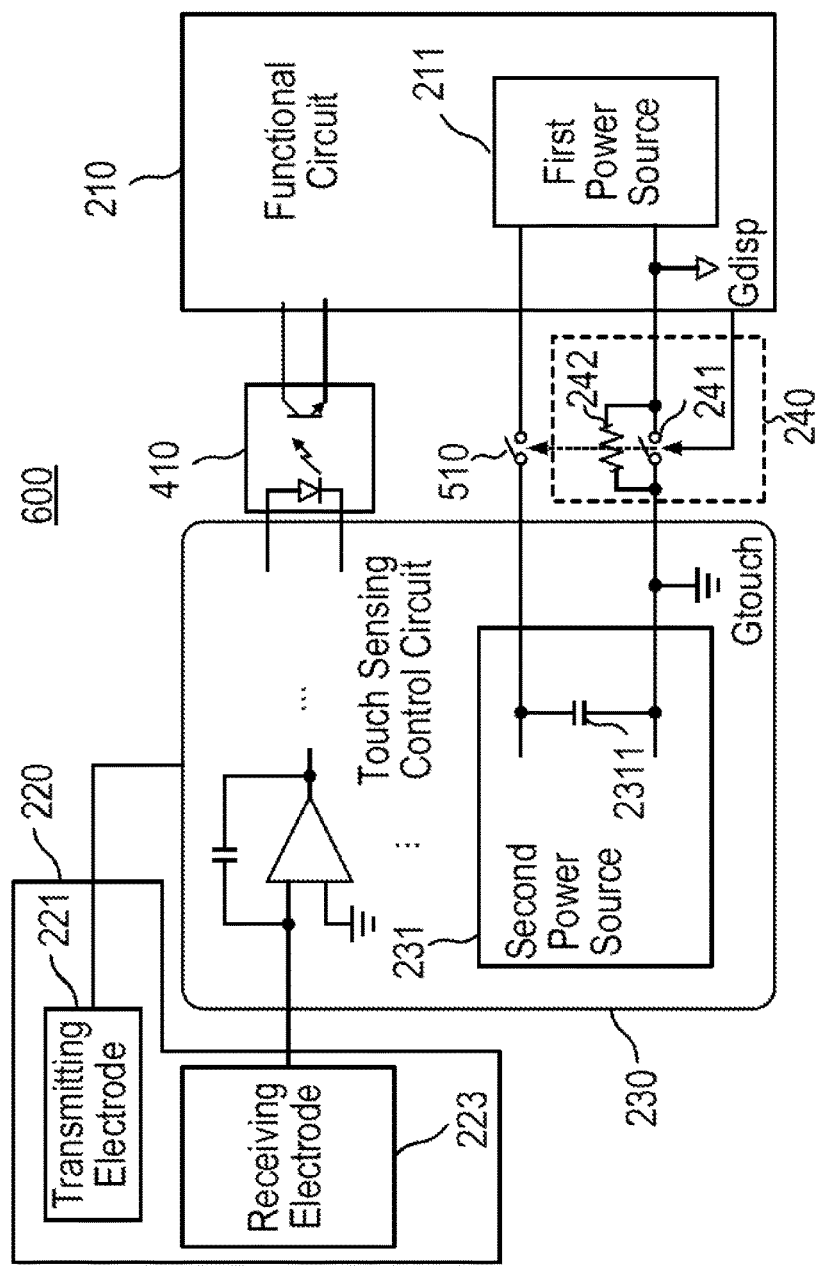
FIG. 6 is a schematic diagram of an electronic device with touch control circuit powered by dedicated power source according to a fourth embodiment of the present invention.

FIG. 6 is a schematic diagram of an electronic device 600 with touch control circuit powered by dedicated power source according to a fourth embodiment of the present invention. This embodiment is similar to that of FIG. 5 except that at least one optical coupling circuit 410 is added. The optical coupling circuit 410 is disposed between the functional circuit 210 and the touch sensing control circuit 230 for performing signal transmission therebetween.

Figure 7:
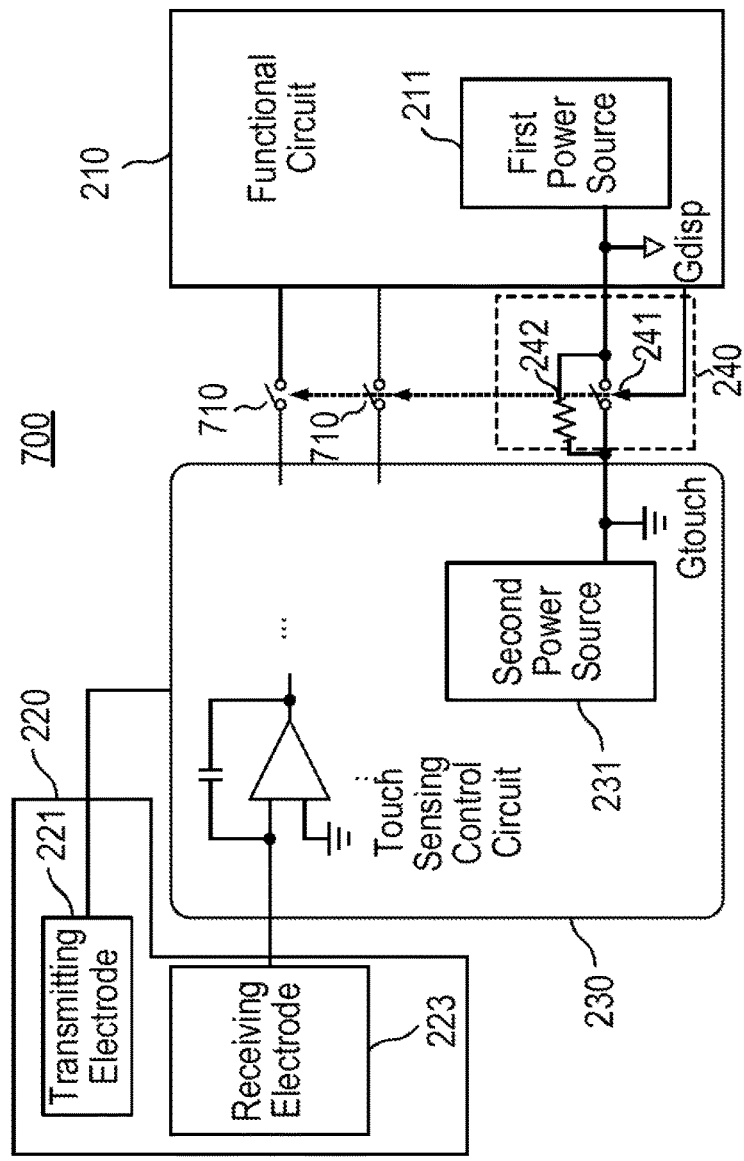
FIG. 7 is a schematic diagram of an electronic device with touch control circuit powered by dedicated power source according to a fifth embodiment of the present invention.

FIG. 7 is a schematic diagram of an electronic device 700 with touch control circuit powered by dedicated power source according to a fifth embodiment of the present invention. This embodiment is similar to that of FIG. 2 except that at least one data transmission switch element 710 is added. The at least one data transmission switch element 710 is disposed between the touch sensing control circuit 230 and the functional circuit 210. As a result, during the operation exclusive of touch sensing, the at least one data transmission switch element 710 is switched on to allow a data transmission between the touch sensing control circuit 230 and the functional circuit 210. In this embodiment, the switch elements are switched on and off under the control of the functional circuit 210. In other embodiments, the switch elements can be switched on and off under the control of the touch sensing control circuit 230. Optionally, the touch sensing control circuit 230, the second power source 231 and the at least one data transmission switch element 710 are implemented in an integrated circuit chip.

Figure 8:
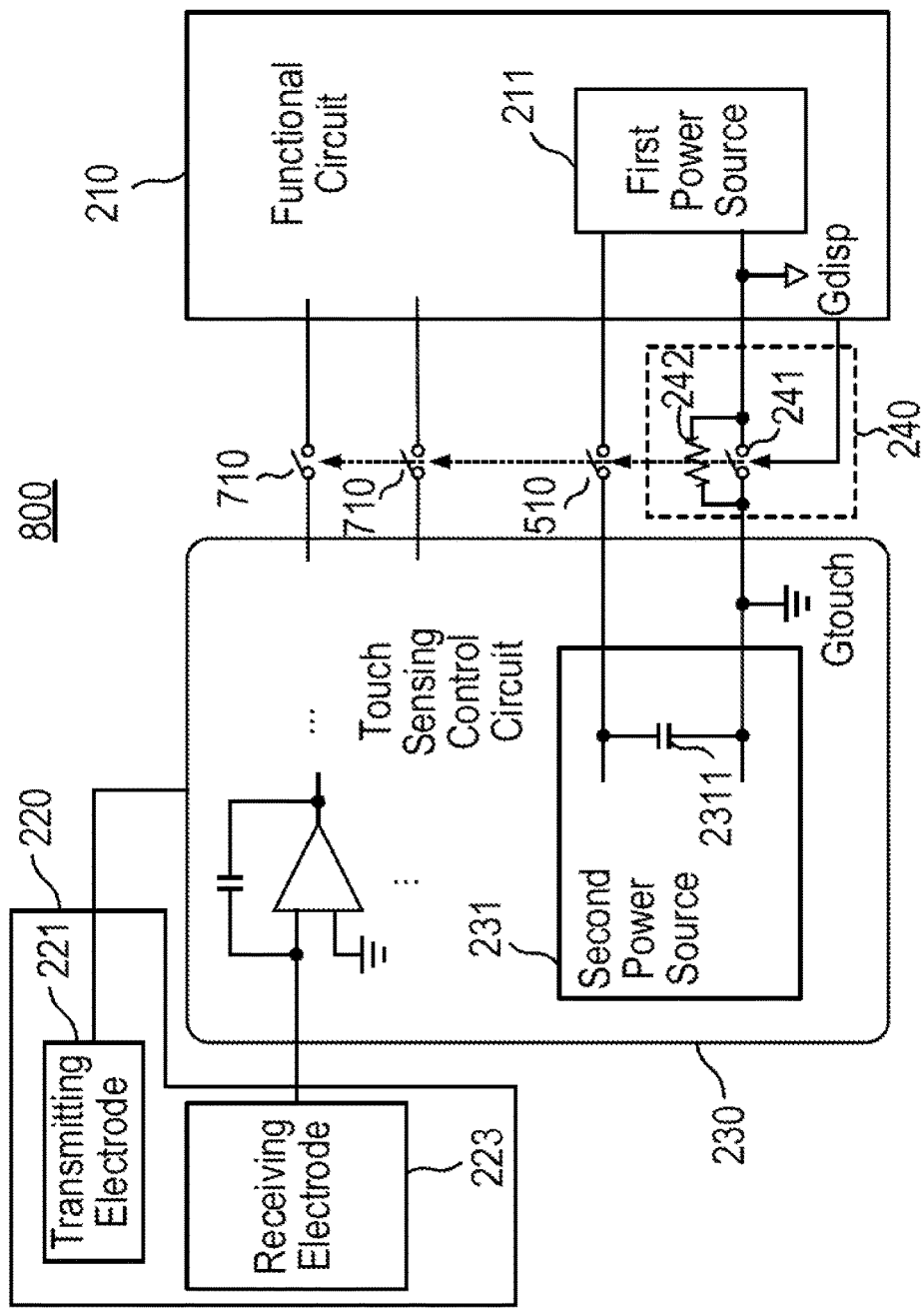
FIG. 8 is a schematic diagram of an electronic device with touch control circuit powered by dedicated power source according to a sixth embodiment of the present invention.

FIG. 8 is a schematic diagram of an electronic device 800 with touch control circuit powered by dedicated power source according to a sixth embodiment of the present invention. This embodiment is similar to that of FIG. 6 except that the at least one optical coupling circuit 410 is removed and at least one data transmission switch element 710 is added. The at least one data transmission switch element 710 is disposed between the touch sensing control circuit 230 and the functional circuit 210. As a result, during the operation exclusive of touch sensing, the at least one data transmission switch element 710 is switched on to allow a data transmission between the touch sensing control circuit 230 and the functional circuit 210. In this embodiment, the switch elements are switched on and off under the control of the functional circuit 210. In other embodiments, the switch elements can be switched on and off under the control of the touch sensing control circuit 230.

Figure 9:
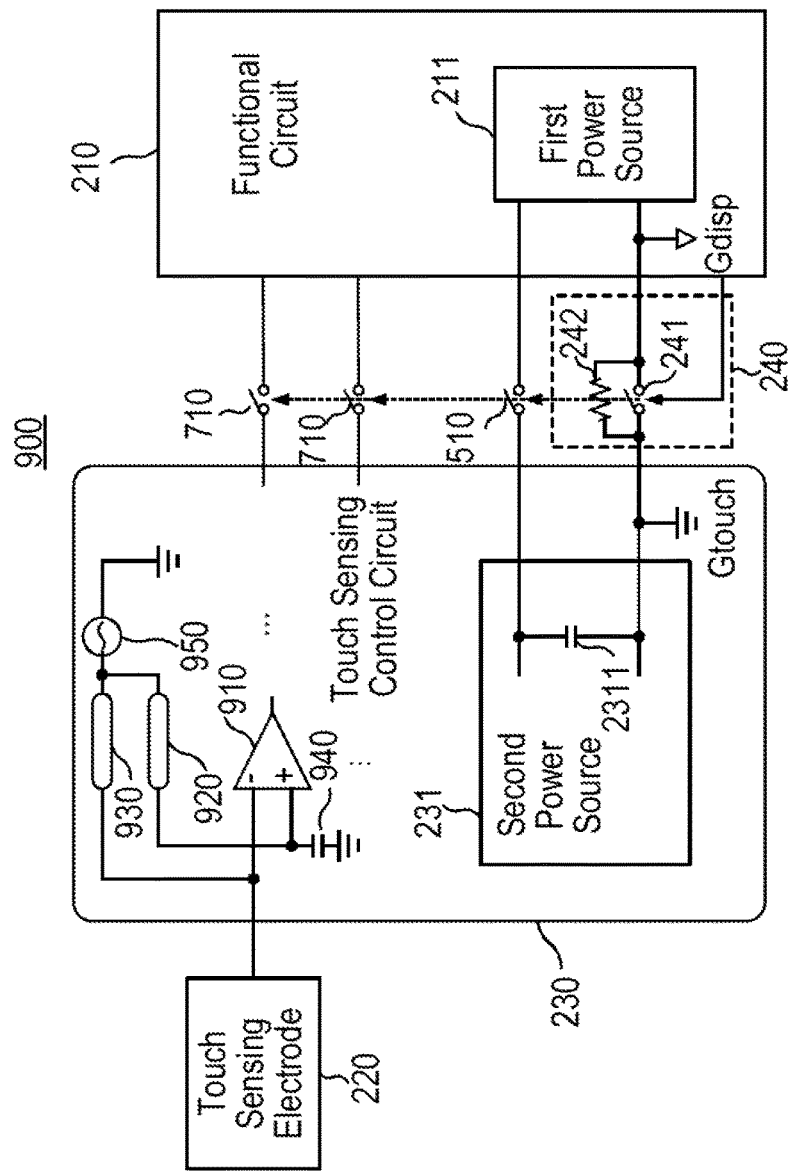
FIG. 9 is a schematic diagram of an electronic device with touch control circuit powered by dedicated power source according to a seventh embodiment of the present invention.

FIG. 9 is a schematic diagram of an electronic device 900 with touch control circuit powered by dedicated power source according to a seventh embodiment of the present invention. This embodiment is similar to that of FIG. 8 except that the touch sensing electrodes 220 in FIG. 8 are divided into transmitting electrodes (TX) 221 and receiving electrodes (RX) 223, while the touch sensing electrodes 220 in FIG. 9 are not divided into transmitting and receiving electrodes; i.e., the touch sensing operation in FIG. 9 is a self-capacitance touch sensing mode. In FIG. 9, a differential amplifier 910, a first impedance element 920, a second impedance element 930, a first capacitor 940, and a signal source 950 are added. The technique of self-capacitance touch sensing mode in FIG. 9 is known to those skilled in the art by referencing to, for example, U.S. Pat. No. 8,704,539 granted to Lee, et al. for a "Minute impedance variation detection device".

Figure 10:
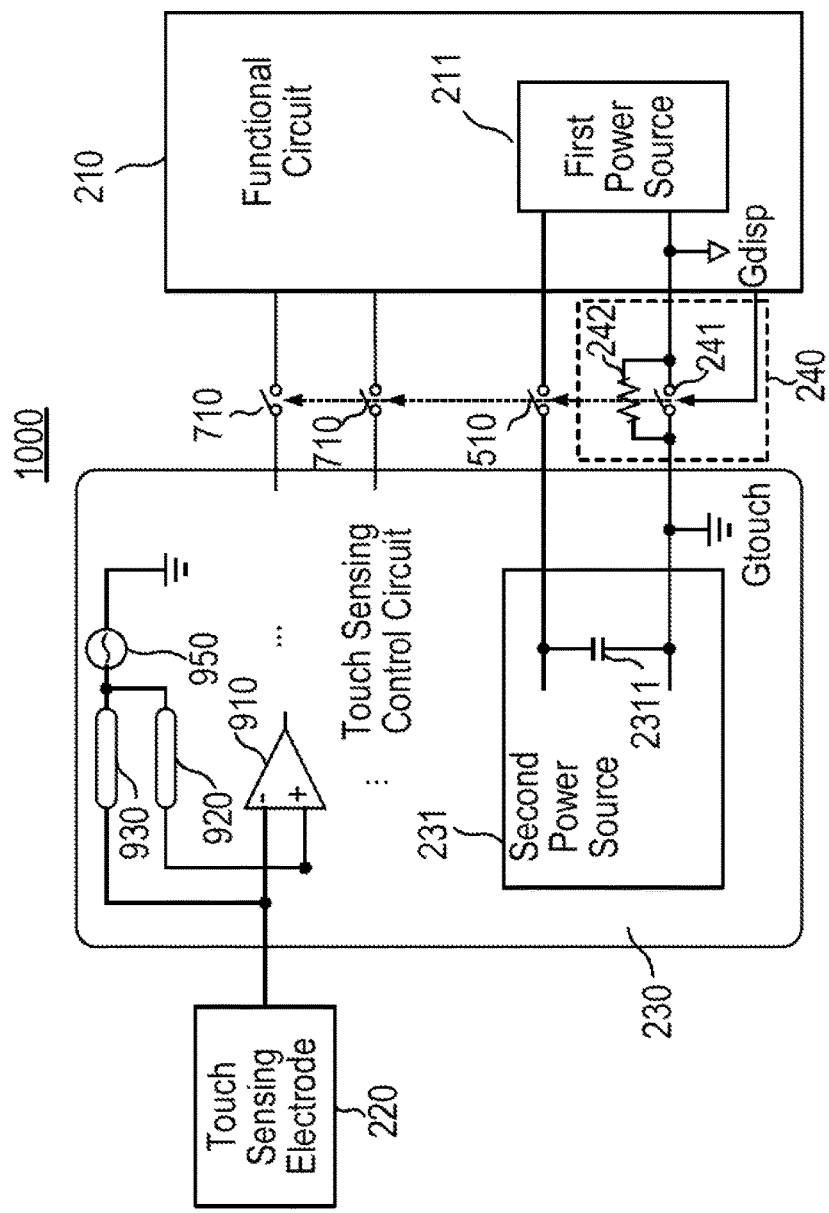
FIG. 10 is a schematic diagram of an electronic device with touch control circuit powered by dedicated power source according to an eighth embodiment of the present invention.

FIG. 10 is a schematic diagram of an electronic device 1000 with touch control circuit powered by dedicated power source according to an eighth embodiment of the present invention. This embodiment is similar to that of FIG. 9 except that the first capacitor 940 is removed and the first impedance element 920 is connected to the positive terminal (+) of the differential amplifier 910.

Figure 11:
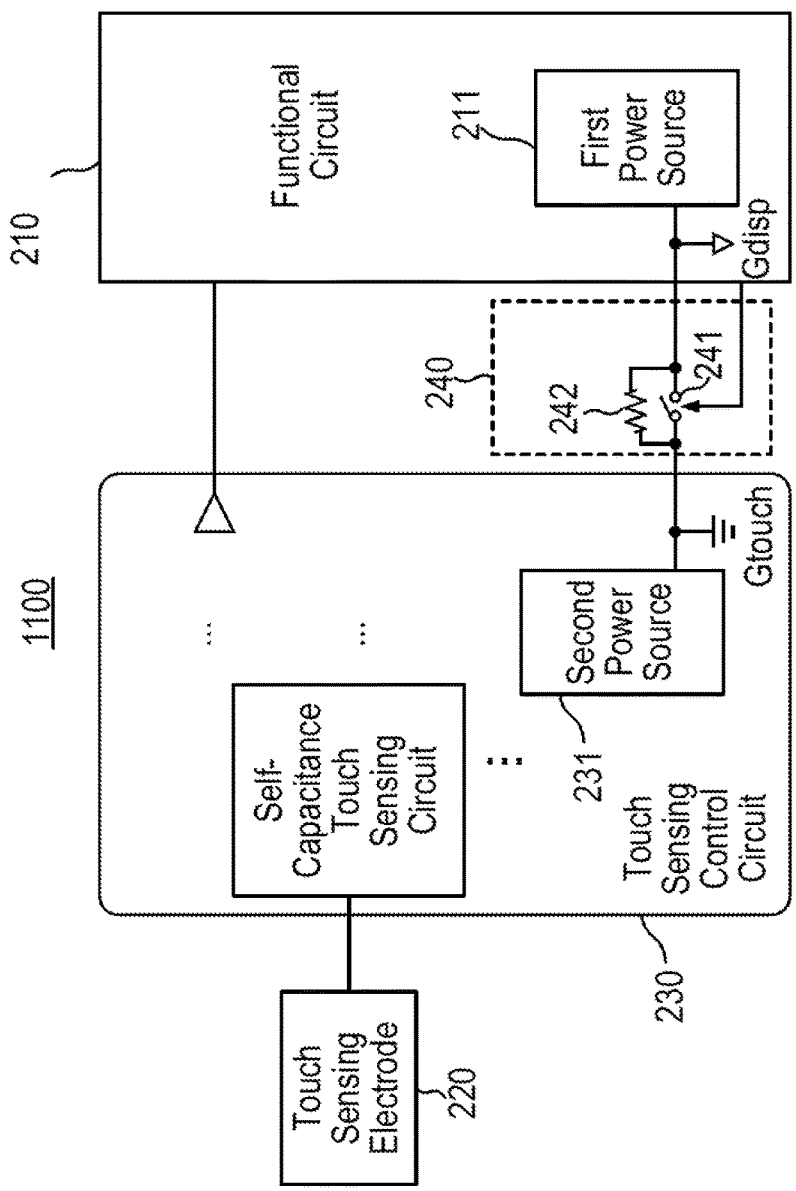
FIG. 11 is a schematic diagram of an electronic device with touch control circuit powered by dedicated power source according to a ninth embodiment of the present invention.

FIG. 11 is a schematic diagram of an electronic device 1100 with touch control circuit powered by dedicated power source according to a ninth embodiment of the present invention. This embodiment is similar to that of FIG. 2 except that the mutual-capacitance touch sensing mode is changed into the self-capacitance touch sensing mode.

Figure 12:
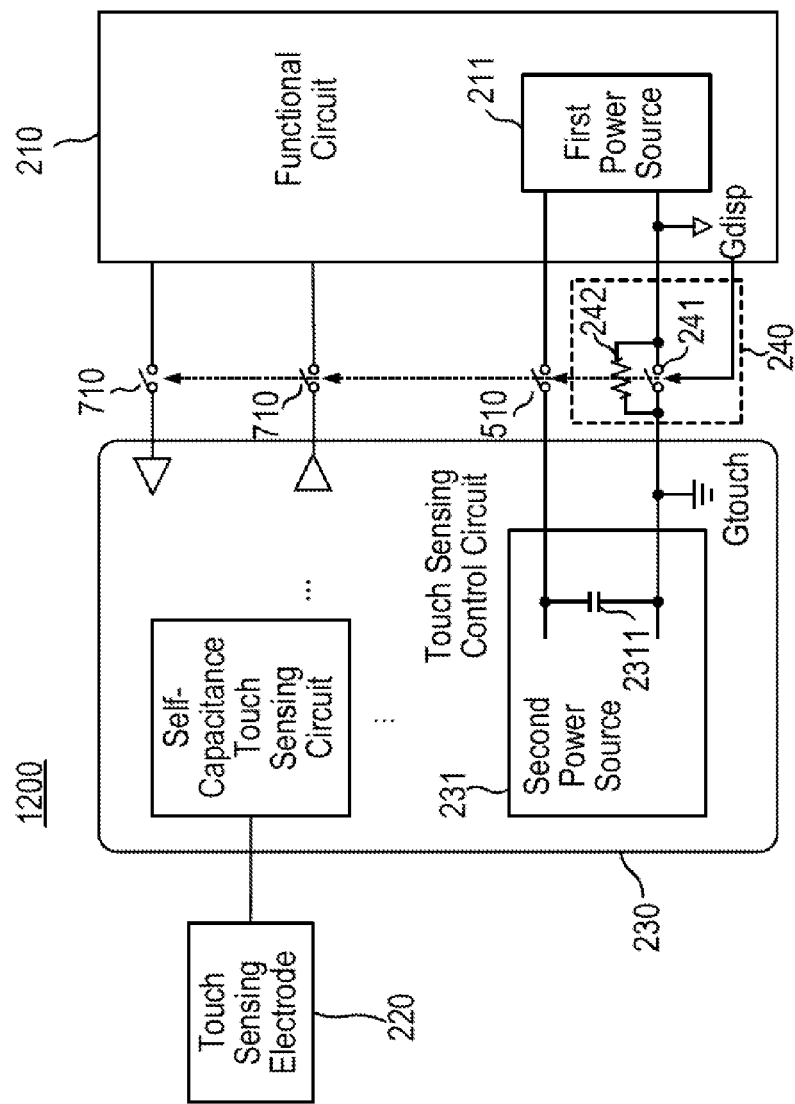
FIG. 12 is a schematic diagram of an electronic device with touch control circuit powered by dedicated power source according to a tenth embodiment of the present invention.

FIG. 12 is a schematic diagram of an electronic device 1200 with touch control circuit powered by dedicated power source according to a tenth embodiment of the present invention. This embodiment is similar to that of FIG. 8 except that the mutual-capacitance touch sensing mode is changed into the self-capacitance touch sensing mode.

Figure 13:
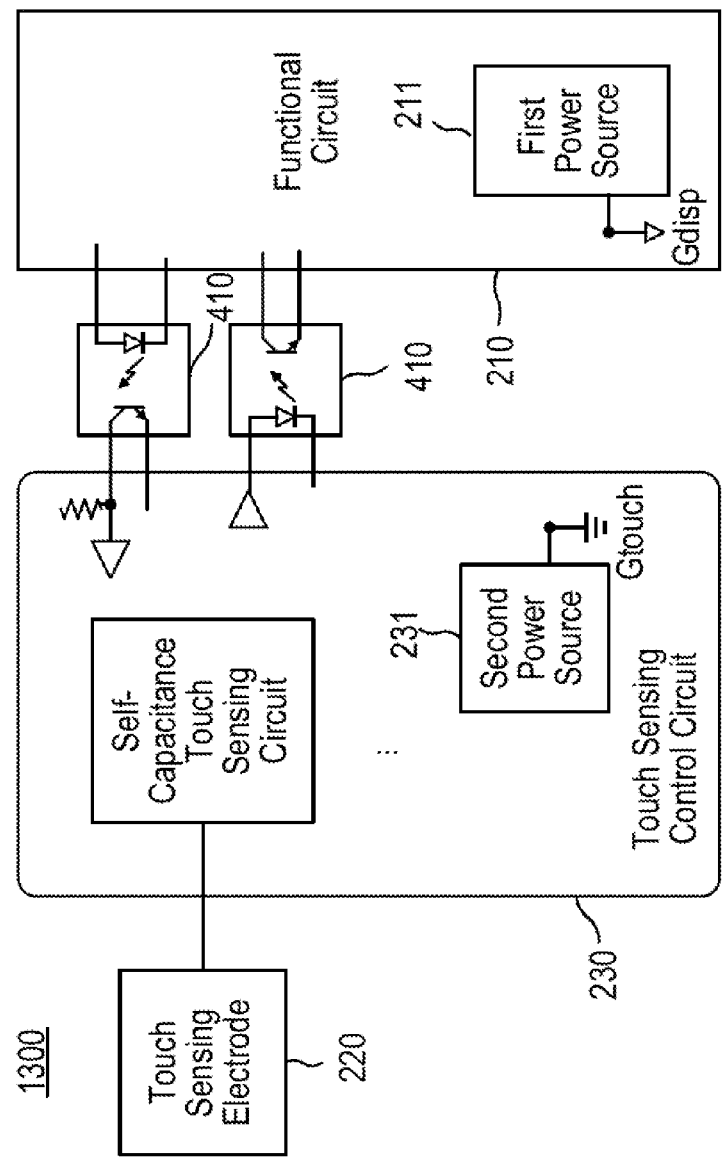
FIG. 13 is a schematic diagram of an electronic device with touch control circuit powered by dedicated power source according to an eleventh embodiment of the present invention.

FIG. 13 is a schematic diagram of an electronic device 1300 with touch control circuit powered by dedicated power source according to an eleventh embodiment of the present invention. This embodiment is similar to that of FIG. 4 except that the mutual-capacitance touch sensing mode is changed into the self-capacitance touch sensing mode.

In view of the foregoing, it is known that, in the present invention, there is no common current loop between the first power source 211 and the second power source 231 during the operation of touch sensing, such that the signal or noise on the functional circuit 210 does not influence the touch sensing control circuit 230. Thus, the touch sensing accuracy of the touch sensing circuit 230 can be increased significantly.

Although the present invention has been explained in relation to its preferred embodiment, it is to be understood that many other possible modifications and variations can be made without departing from the spirit and scope of the invention as hereinafter claimed.

What is claimed is:

1. An electronic device with touch control circuit powered by dedicated power source, comprising:
    a functional circuit powered by a first power source;
    a plurality of touch sensing electrodes for sensing a touch from an external object; and
    a touch sensing control circuit powered by a second power source which is different from the first power source, and connected to the plurality of touch sensing electrodes for driving the plurality of touch sensing electrodes to sense the touch of the external object,
    wherein there is no common current loop between the first power source and the second power source during an operation of touch sensing; and
    a switch device connected between a grounding terminal of the first power source and a grounding terminal of the second rower source for controlling the grounding terminal of the first power source and the grounding terminal of the second power source to be disconnected or connected.

2. The electronic device with touch control circuit powered by dedicated power source as claimed in claim 1, wherein the first power source and the second power source are disconnected from each other during the operation of touch sensing so that there is no common current loop therebetween.

3. The electronic device with touch control circuit powered by dedicated power source as claimed in claim 2, wherein the first power source and the second power source are connected to each other during an operation exclusive of touch sensing so that there is a common current loop therebetween.

4. The electronic device with touch control circuit powered by dedicated power source as claimed in claim 1, wherein the switch device is a transistor switch element.

5. The electronic device with touch control circuit powered by dedicated power source as claimed in claim 4, wherein the touch sensing control circuit, the second power source, and the switch device are implemented in an integrated circuit chip.

6. The electronic device with touch control circuit powered by dedicated power source as claimed in claim 1, further comprising a high impedance element connected in parallel with the switch device.

7. The electronic device with touch control circuit powered by dedicated power source as claimed in claim 1, further comprising at least one optical coupling circuit disposed between the functional circuit and the touch sensing control circuit for performing signal transmission therebetween.

8. The electronic device with touch control circuit powered by dedicated power source as claimed in claim 7, wherein the touch sensing control circuit, the second power source, and the at least one optical coupling circuit are implemented in an integrated circuit chip.

9. The electronic device with touch control circuit powered by dedicated power source as claimed in claim 1, further comprising a power charging loop switch element disposed between the first power source and the second power source, such that, during an operation exclusive of touch sensing, the power charging loop switch element is switched on to allow the first power source to charge the second power source.

10. The electronic device with touch control circuit powered by dedicated power source as claimed in claim 9, wherein the touch sensing control circuit, the second power source, and the power charging loop switch element are implemented in an integrated circuit chip.

11. The electronic device with touch control circuit powered by dedicated power source as claimed in claim 1, further comprising at least one data transmission switch element disposed between the touch sensing control circuit and the functional circuit, such that, during an operation exclusive of touch sensing; the at least one data transmission switch element is switched on to allow a data transmission between the touch sensing control circuit and the functional circuit.

12. The electronic device with touch control circuit powered by dedicated power source as claimed in claim 11, wherein the touch sensing control circuit, the second power source, and the at least one data transmission switch element are implemented in an integrated circuit chip.

13. The electronic device with touch control circuit powered by dedicated power source as claimed in claim 1, wherein the functional circuit is a display control circuit connected to a display unit for controlling the display unit to display image.

* * * * *